Sept. 17, 1963  E. KAWECKI  3,103,816
CAP AND GAUGE STRUCTURE FOR CRANKCASE FILL OPENING
Filed Nov. 25, 1960
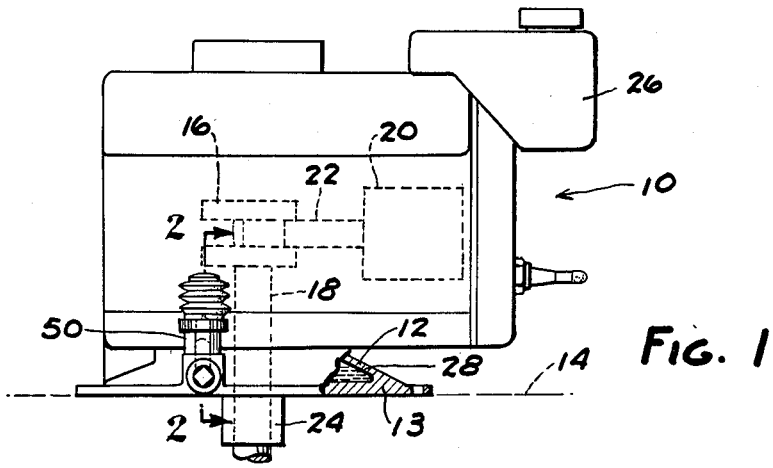
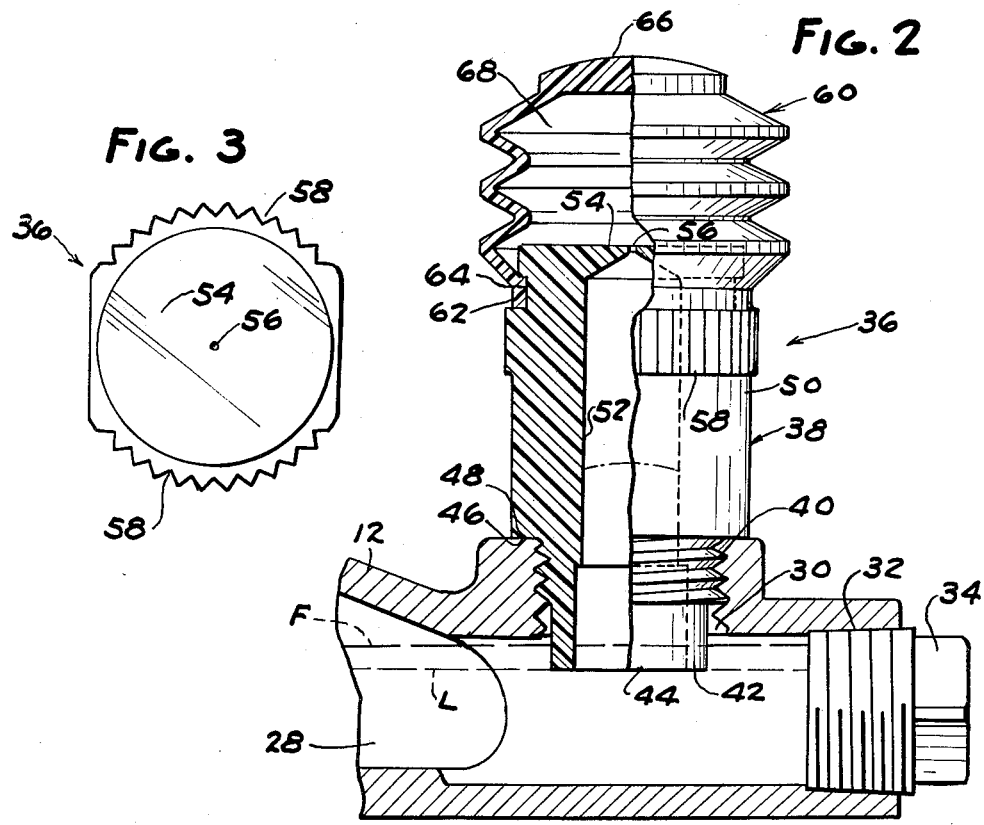
INVENTOR.
EUGENE KAWECKI
BY
Barnes, Kisselle, Raisch & Choate
ATTORNEYS

United States Patent Office 3,103,816
Patented Sept. 17, 1963

3,103,816
CAP AND GAUGE STRUCTURE FOR CRANKCASE FILL OPENING
Eugene Kawecki, Detroit, Mich., assignor to Sturdevant Manufacturing Corporation, Detroit, Mich., a corporation of Michigan
Filed Nov. 25, 1960, Ser. No. 71,694
4 Claims. (Cl. 73—323)

The cap and gauge structure of this invention is particularly well adapted for use on relatively small gasoline engines of the type used to power lawnmowers, garden machinery and the like. The object of the invention is to provide a simple, inexpensive cap and gauge structure which is improved to enable a person, without removing the cap from the fill opening, to determine quickly and conveniently the level of oil in the crankcase and determine the condition of the oil.

The invention generally contemplates a transparent plastic tube threaded for engagement within the fill opening and having a lower end which projects into the crankcase to the low critical oil level. A vacuum bulb is sealed to the upper end of the tube and is operable to draw oil up into the gauge portion of the tube extending exteriorly of the crankcase when the oil level is above low critical level. The presence of oil in the gauge indicates that the oil level in the crankcase is above critical. The condition of the oil i.e. whether dirty or clean can be determined visually. In certain types of engines the device operates automatically upon each stopping of the engine without the necessity of manual manipulation of the vacuum bulb.

Selected for illustration of the invention is a typical rotary blade type lawnmower engine.

In the drawings:

FIG. 1 is a partly diagrammatic elevational view of an engine with the cap and gauge structure of this invention installed thereon, parts being shown in phantom and parts being broken away to illustrate structure.

FIG. 2 is an enlarged view illustrating the gauge partly in elevation and partly in section on line 2—2 of FIG. 1.

FIG. 3 is a top plan view of the plastic tube separate from the other parts.

Shown in the drawings is a gasoline engine 10 having a crankcase 12 with a base 13 adapted to be mounted on top of equipment 14 such as a rotary blade type lawnmower. Within the crankcase is a crank 16 and a vertical crankshaft 18 which are driven by a piston 20 and connecting rod 22. The crankshaft is journaled in a bearing 24. A gasoline tank is shown at 26. The lower portion 28 of the crankcase provides an oil reservoir having a threaded fill opening 30 and a threaded drain opening 32 closed by a drainplug 34.

A cap and gauge structure 36 according to this invention closes fill opening 30 during operation of the engine. The cap and gauge includes a tubular body 38 having a threaded portion 40 engageable in threaded fill opening 30. The lower end portion 42 of the tube projects downwardly into the interior of the crankcase or oil reservoir a pre-determined distance so that its very end 44 is at the low critical oil level L in the crankcase. Adjacent the upper end of threaded portion 40 of the tube is a radial shoulder 46 which abuts a face 48 on the crankcase to vertically position tube end 44 and provide a seal around fill opening 30.

The tube has a portion 50 which extends upwardly from shoulder 46 and which is transparent so that the contents of the internal passageway 52 of the tube can be visually observed. Passageway 52 is in communication with the crankcase interior through the lower open end 44 of the tube and the upper end of the passageway is closed as at 54 except for a small port or orifice 56 for a purpose to be described. The tube exterior is provided with serrations 58 forming finger holds to facilitate screwing the tube into and out of fill opening 30.

Tube 36 is formed of a suitable transparent plastic which is impervious to the effects of oil. Suitable materials include acrylic plastics such as Plexiglass and Lucite and stabilized cellulose acetate such as Forticel produced by Celanese Corporation.

A vacuum producing bulb 60 is secured to the upper end portion of tube 36 by means of a bead 62 which sealingly engages within a generally complementally shaped circumferential groove 64 in the tube. The bulb is formed of an oil impervious, flexible, resiliently distortable material such as a synthetic rubber or a polyvinyl chloride. The bulb is shown in FIG. 2 in its unstressed expanded condition and has bellows conformation so that it can be collapsed conveniently by vertical finger pressure on its top 66 to expel air from its interior 68.

In use it may be assumed that oil reservoir 28 has been filled to a full level F and that tube 38 has been threaded into fill opening 30 so that the interengaged threads and interfacing shoulders 46, 48 effectively close the fill opening. When the engine 10 is started, nearly all of the oil in the reservoir is drawn up into the engine so that the oil level falls below the lower end 44 of tube 38. Vertical crankshaft engines such as the one shown are conventionally provided with a crankcase breather (not shown) in the nature of a check valve so that when the engine is in operation a partial vacuum of from about 1″ to 6″ of water is maintained in the crankcase. The purpose of this is to prevent oil from being forced out of the crankcase in the region of bearing 24. This partial vaccuum is communicated to the bulb interior 68 through passageway 52 and orifice 56 so that exterior atmospheric pressure on the bellows collapses it.

When the engine is stopped, the oil returns quickly to reservoir 28 and its level rises above lower end 44 of tube 38 before the resiliently expansible bellows can draw an appreciable amount of air upwardly through orifice 56. As a result the expanding bulb draws a column of oil up into transparent portion 50 where it can be visually observed. When the engine is again started and the oil level lowers in the reservoir, the oil in the tube drains back into the crankcase and bellows 60 again collapses. When the engine is stopped again a column of oil is again drawn up into transparent gauge portion 50.

Thus as long as the oil level in reservoir 28 remains at or above lower end 44 of the gauge tube, a column of oil will automatically be drawn upwardly into the gauge where it can be seen each time the engine is stopped. If the oil level in the reservoir should fall below critical level L no oil will be drawn up into the gauge upon expansion of bellows 60 when the engine is stopped. Thus after each stopping of the engine the gauge and cap structure operates automatically to show the operator whether or not there is an adequate supply of oil in the reservoir and also shows the operator whether the oil is clean or dirty.

It is a great convenience to the operator not to have to remove the cap from fill opening 30 and use a dipstick to determine the oil level or to determine the condition of the oil. During ordinary operation of equipment such as a lawn mower considerable caked oil and dust forms around exterior portions of the engine and it is almost inevitable that some of this dirt will fall into the crankcase through the fill opening each time the cap is removel. With the present structure, the cap need not be removed except actually to fill the crankcase since the operator can determine without removing the cap what the oil level is and what condition it is in. This dirt exclusion feature prolongs the life of the engine.

During operation of the engine, there is a great deal of sudden pressure fluctuation within the crankcase because of the action of piston 20 and the usual blow-by during the work stroke of the piston. If tube passageway 52 were to directly open into bulb interior 68 without orifice 56, bulb 60 would be subject to a great deal of relatively violent flexing which would shorten its life. Relatively small port 56 passes only a small volume of air as a result of pressure fluctuations in the crankcase and thus greatly damps the effect of these fluctuations on the bulb interior. This increases the effective life of the bulb.

When failure of a column of oil to rise in gauge 50 indicates that the oil level is low or when the oil is shown to be dirty, the cap and gauge 36 is removed from filler opening 30 by grasping serrations 50 and threading the cap out of the fill opening. The supply of oil may then be replenished through the fill opening or the old oil may be drained by removal of drainplug 34 and after the drainplug is replaced, the crankcase may be filled through opening 30. Cap and gauge 36 is then threaded back into the opening to again close it.

Engines utilizing a horizontal crankshaft rather than a vertical crankshaft frequently do not use the check valve type of breather to maintain a vacuum in the crankcase during operation because the crankshaft passes through the crankcase wall above oil level and there is less tendency to lose oil through the crankshaft bearings. When the cap and gauge is applied to such an engine, bellows 60 will not be automatically collapsed during operation of the engine and will not automatically draw oil up into gauge portion 50 when the engine is stopped. However, in such an installation, the operator merely depresses the top 66 of the bellows to collapse it and then releases it. If the oil level is above L, a column of oil will be drawn up into the gauge where it can be seen. If the oil level is below the critical level, the operator will know it because no oil will be drawn up into the gauge. Here again the operator can determine the level of the oil and the condition of the oil without removing the cap and gauge from fill opening 30.

I claim:

1. A cap and gauge for the fill opening of a crankcase comprising,
    means providing a tube having a generally central portion adapted to be detachably engaged in closing and pressure sealing relation to a fill opening,
    said tube having an end portion adapted to project to the crankcase interior and having an opening substantially at the low critical level of oil in the crankcase, said tube having another portion with a transparent side wall adapted to project exteriorly of the crankcase, said another tube portion having a closure, means providing a small orifice in said closure,
    means providing a resiliently distortable vacuum-producing bulb secured to said other end of said tube and being in communication with the tube interior through said orifice so that pressure fluctuations in said crankcase are transmitted to the bulb interior in damped condition through said orifice,
    said orifice being dimensioned to restrict flow of fluid into said bulb under the recovery force exerted by said bulb in collapsed condition,
    and being adequate to delay substantial resilient recovery of said bulb for a period of time greater than that required for oil to return to an engine crankcase subsequent to stopping of the engine,
    said bulb upon recovery thereof being operable to draw fluid through said orifice, whereby to draw a column of oil from the crankcase into said other portion.

2. The combination defined in claim 1 wherein said central portion of said tube is threaded for engagement within a fill opening, said tube having a portion adjacent the threaded portion adapted to sealingly engage a portion of a crankcase surrounding the fill opening.

3. The combination defined in claim 1 wherein,
    said central portion of said tube is threaded for engagement within a fill opening,
    said tube having a radial face adjacent the threaded portion adapted for sealing engagement with a portion of a crankcase surrounding the fill opening.

4. In combination with an engine of the type which has a vacuum in its crankcase during operation, a cap and gauge as defined in claim 1,
    said central portion of said cap and gauge being engaged in closing and sealing relation to said fill opening so that during operation of the engine said bulb is held in collapsed condition and automatically draws a column of oil from the crankcase into said tube responsive to stopping of the engine.

References Cited in the file of this patent
UNITED STATES PATENTS

| | | |
|---|---|---|
| 1,609,911 | Marsh | Dec. 7, 1926 |
| 2,043,877 | Ashworth | June 9, 1936 |

FOREIGN PATENTS

| | | |
|---|---|---|
| 833,824 | Great Britain | Apr. 27, 1960 |